US010055308B2

(12) United States Patent
Tomnikov

(10) Patent No.: US 10,055,308 B2
(45) Date of Patent: Aug. 21, 2018

(54) SYSTEM AND METHOD OF DATA LOSS PREVENTION

(71) Applicant: SAP Portals Israel Ltd., Ra'Anana (IL)

(72) Inventor: Vadim Tomnikov, Kfar Saba (IL)

(73) Assignee: SAP Portals Israel Ltd., Ra'Anana (IL)

( * ) Notice: Subject to any disclaimer, the term of this patent is extended or adjusted under 35 U.S.C. 154(b) by 470 days.

(21) Appl. No.: 14/827,962

(22) Filed: Aug. 17, 2015

(65) Prior Publication Data

US 2017/0052853 A1   Feb. 23, 2017

(51) Int. Cl.
*G06F 17/30* (2006.01)
*G06F 11/14* (2006.01)
*H04L 29/08* (2006.01)

(52) U.S. Cl.
CPC .... *G06F 11/1464* (2013.01); *G06F 17/30899* (2013.01); *H04L 67/02* (2013.01); *G06F 2201/835* (2013.01)

(58) Field of Classification Search
CPC .......... G06F 11/1464; G06F 17/30899; G06F 2201/835; H04L 67/02
See application file for complete search history.

(56) References Cited

U.S. PATENT DOCUMENTS

| | | | | |
|---|---|---|---|---|
| 9,189,564 B2* | 11/2015 | Kim | ................. | G06F 17/30905 |
| 2005/0081121 A1* | 4/2005 | Wedel | ................. | H04L 67/1095 |
| | | | | 714/48 |
| 2011/0055683 A1* | 3/2011 | Jiang | ................. | G06F 17/30899 |
| | | | | 715/234 |
| 2013/0073536 A1* | 3/2013 | Fedorynski | ....... | G06F 17/30864 |
| | | | | 707/709 |
| 2013/0191435 A1* | 7/2013 | Gittelman | ......... | G06F 17/30873 |
| | | | | 709/201 |
| 2015/0046848 A1* | 2/2015 | Vohra | ................ | H04M 1/72522 |
| | | | | 715/760 |

* cited by examiner

*Primary Examiner* — Jared M Bibbee
(74) *Attorney, Agent, or Firm* — Schwegman Lundberg & Woessner, P.A.

(57) ABSTRACT

In some example embodiments, a request for a navigation action is detected via a web browser during a pre-navigation state of a single page application, and a state object is persisted, with the state object comprising a dictionary property and an index property. The dictionary property comprises a list of all uniform resource locator (URL) fragments stored in a browser history, with the list of URL fragments comprising a pre-navigation URL fragment for the pre-navigation state and a post-navigation URL fragment for a post-navigation state. The pre-navigation state is navigated to within the web browser using the state object. Based on a detection of unsaved data, a navigation confirmation request is displayed within the recovered pre-navigation state of the single-page application using the pre-navigation URL fragment. The navigation confirmation request is configured to receive an indication of whether or not to perform the navigation action.

18 Claims, 13 Drawing Sheets

SYSTEM AND METHOD OF DATA LOSS PREVENTION

TECHNICAL FIELD

The present application relates generally to the technical field of data processing, and, in various embodiments, to systems and methods of data loss prevention.

BACKGROUND

A data lifecycle in web applications may include states when data created, deleted or modified by a user via a user interface (UI) is not persisted yet. In cases where the user navigates to another web page or application, data that has not been persisted may be lost.

BRIEF DESCRIPTION OF THE DRAWINGS

Some example embodiments of the present disclosure are illustrated by way of example and not limitation in the figures of the accompanying drawings, in which like reference numbers indicate similar elements, and in which.

DETAILED DESCRIPTION

Figure 1:
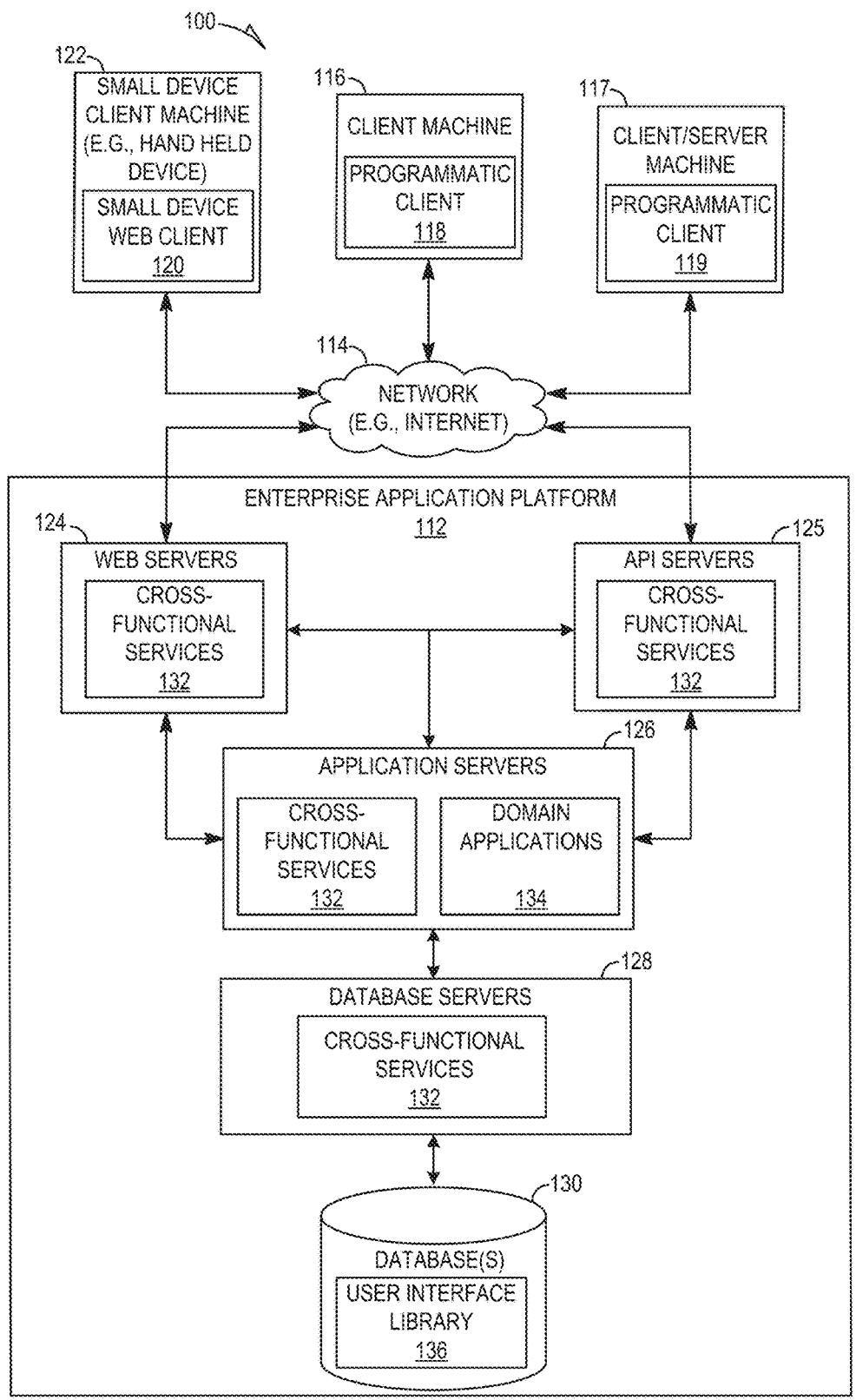
FIG. 1 is a network diagram illustrating a client-server system, in accordance with some example embodiments.

Example methods and systems of data loss prevention are disclosed. In the following description, for purposes of explanation, numerous specific details are set forth in order to provide a thorough understanding of example embodiments. It will be evident, however, to one skilled in the art that the present embodiments can be practiced without these specific details.

The present disclosure provides data loss prevention techniques and mechanisms to address the technical problem of avoiding accidental data loss.

In some example embodiments, a request for a navigation action is detected via a web browser during a pre-navigation state of a single page application within the web browser, and a state object is persisted. In some example embodiments, the state object comprises a dictionary property and an index property. In some example embodiments, the dictionary property comprises a list of all uniform resource locator (URL) fragments stored in a browser history of the web browser, with the list of URL fragments comprising a pre-navigation URL fragment corresponding to the pre-navigation state and a post-navigation URL fragment corresponding to a post-navigation state, and the post-navigation state corresponding to a result of a performance of the navigation action. In some example embodiments, the index property comprises an index of a current URL fragment in the list of the dictionary property. In some example embodiments, based on the detection of the request, the pre-navigation state of the single-page application is navigated to within the web browser using the state object, unsaved data for the single-page application is detected, and a navigation confirmation request is displayed within the recovered pre-navigation state of the single-page application using the pre-navigation URL fragment based on the detecting the unsaved data, with the navigation confirmation request being configured to receive an indication of whether or not to perform the navigation action within the web browser.

In some example embodiments, an indication to perform the navigation action is received via the navigation confirmation request, and the navigation action is performed within the browser based on the indication to perform the action, with the performing the navigation action comprising navigating to the post-navigation state of the single-page application using the post-navigation URL fragment. In some example embodiments, an indication to not perform the navigation action is received via the navigation confirmation request, and the navigation action is not performed within the browser based on the indication to not perform the navigation action.

In some example embodiments, navigating to the pre-navigation state of the single-page application comprises determining a direction of the navigation action based on a difference between an index of the post-navigation state and an index of the pre-navigation state, and navigating to the pre-navigation URL fragment in an opposite direction of the determined direction of the navigation action.

In some example embodiments, persisting the state object comprises using a history.replaceState( ) application programming interface (API) method. In some example embodiments, the detecting the unsaved data comprises detecting that a dirty bit has been set. In some example embodiments, the navigation action comprises one of a back navigation action and a forward navigation action.

In some example embodiments, the state object further comprises a time property, and the time property comprises a timestamp identifying when the state object was last updated.

The methods or embodiments disclosed herein may be implemented as a computer system having one or more modules (e.g., hardware modules or software modules). Such modules may be executed by one or more processors of the computer system. In some example embodiments, a non-transitory machine-readable storage device can store a set of instructions that, when executed by at least one processor, causes the at least one processor to perform the operations and method steps discussed within the present disclosure.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
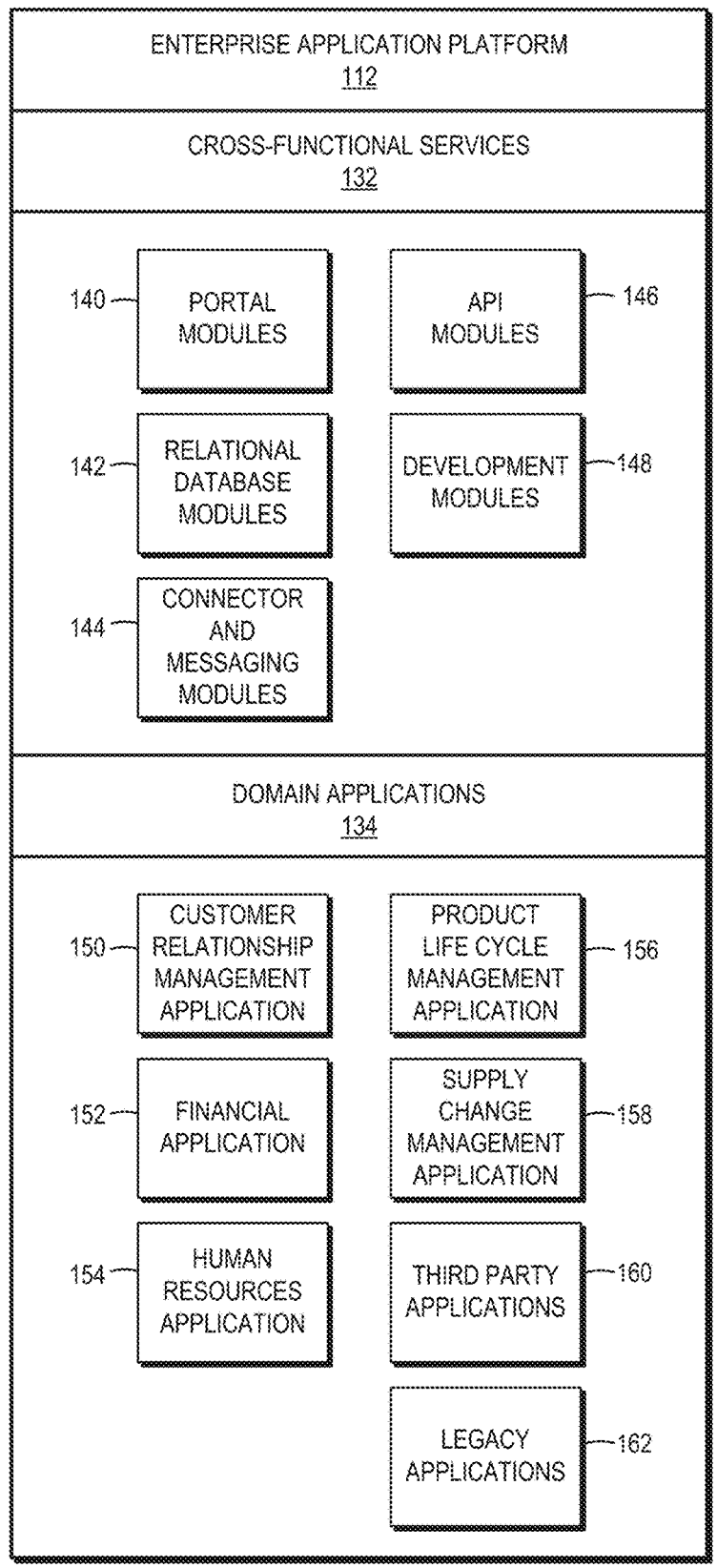
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
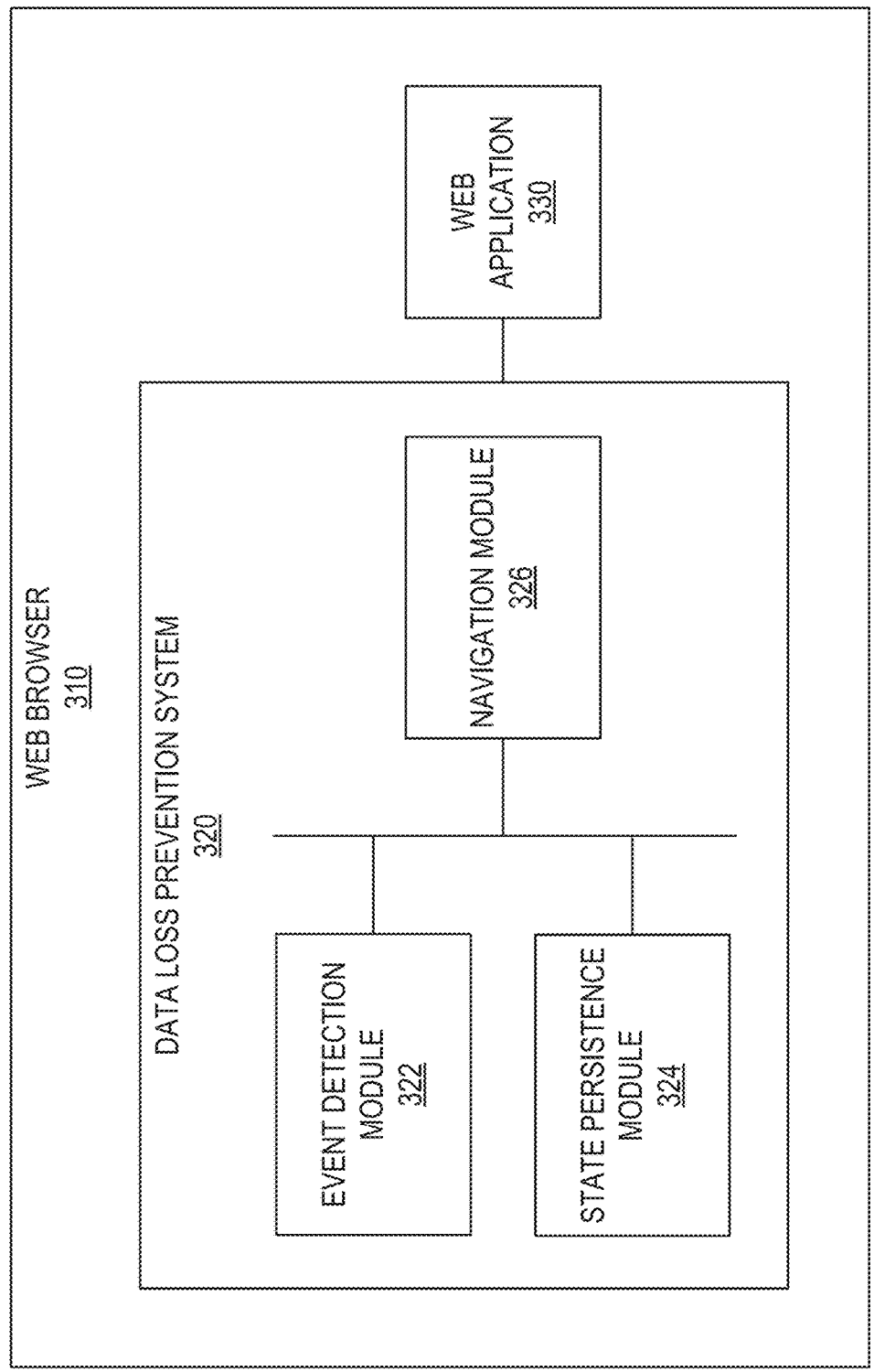
FIG. 3 is a block diagram illustrating a data loss prevention system, in accordance with some example embodiments.

FIG. 3 is a block diagram illustrating components of a data loss prevention system 320, in accordance with some example embodiments. In some example embodiments, the data loss prevention system 320 comprises a framework comprising any combination of one or more of an event detection module 322, a state persistence module 324, and a navigation module 326, which are communicatively coupled to one another. In some example embodiments, the modules 322, 324, and 326 are implemented and executed within a web browser 310, which can reside on a machine having a memory and at least one processor (e.g., client machine 116, 117, or 122 in FIG. 1). However, it is contemplated that other configurations are also within the scope of the present disclosure.

In some example embodiments, the data loss prevention system 320 is communicatively coupled to the web browser 310, which is configured to perform a plurality of navigation actions. These navigation actions can be triggered programmatically or by an end user. Examples of such navigation actions include, but are not limited to, navigating to a web application page from an external page by entering a URL or clicking a link or programmatically changing the URL, invoking a browser back action to a web application page from an external page, invoking a browser forward action to a web application page from an external page, invoking a browser refresh action, navigating from the same web application page with different fragment part, invoking a browser back action within the same web application page with a different fragment part, invoking a browser forward action within the same web application page with a different fragment part, closing a web application browser window or tab, and navigating to an external page from a web application page. Other types of navigation actions are also within the scope of the present disclosure.

In some example embodiments, the data loss prevention system 320 is communicatively coupled to a web application 330, which can comprise any program that runs in the web browser 310. The data loss prevention system 320 and the web application 330 can be transmitted from a server (e.g., one of application servers 126 in FIG. 1) to the web browser 310 for implementation and execution on the web browser 310, although other configurations and embodiments are also within the scope of the present disclosure. The data loss prevention system 320 can employ a variety of techniques to prevent the accidental loss of data of the web application 330.

In some example embodiments, the event detection module 322 is configured to detect a request (e.g., a user click) for a navigation action via the web browser 310. For a web application 330 that uses classical navigation between pages, when each navigation action causes the current page (e.g., the page currently being displayed within the web browser 310) to be unloaded and (optionally) a new page to be loaded afterwards, the navigation module 326 can prompt the end user to select whether to drop all unsaved changes and perform the navigation action or cancel the navigation action in order to be able to save unsaved changes. For example, the navigation module 326 can cause a graphical user interface element to be displayed within the browser, where the graphical user interface element comprises a selectable option to confirm the navigation action or decline the navigation action. In some example embodiments, this technique can use an API provided by the web browser 310 that allows invoking this prompting before the document is unloaded, which can prevent the default browser navigation behavior.

Prompting the user to decide on a navigation action every time navigation is happening, even in cases where no data has been changed, may disturb the end user and lead to a bad user experience. To avoid false positive prompts, data loss prevention techniques of the present disclosure can provide the navigation web applications with an API that allows setting a dirty flag in cases where a data loss prevention operation should be enabled and resetting the dirty flag in cases where all sensitive data has been saved. In some example embodiments, the web application 330 is configured to trigger or configure the navigation module 326 to set or reset the dirty flag depending on whether particular data has been saved or not. The dirty flag can be set and reset in the run-time memory of the web browser 310.

In some example embodiments, the web application 330 employs client-side navigation, also known as fragment navigation or hash navigation, instead of classical navigation. In this client-side navigation, the whole document is not unloaded for a navigation action. Rather, common parts of the application may remain the same and only relevant small parts are changed. Web applications 330 utilizing this technique are usually called single-page applications (SPAs). In order to allow a user to navigate to some specific state of a single-page application, a state is persisted in a fragment part of the URL. Changes in the fragment part of the URL do not unload the document, but allow reacting to its changes. However this technique has a side effect: since there is no document unload, the data loss prevention mechanism discussed above for classical navigation pages is not applicable.

The present disclosure provides technical solutions for enabling SPAs to have similar data loss prevention functionality as non-SPAs (e.g., classical navigation pages). Currently, there is no API available in any browser, or any other solution, that enables the user to prevent the change of the URL fragment before the actual change is applied to the URL. Current web applications may be notified about URL fragment changes only after the actual change has been applied to the URL.

As will be discussed in further detail below, in some embodiments, in response to a request for a navigation action, the data loss prevention system 320 holds off on proceeding with the requested navigation action, recovers the previous URL fragment (e.g., the state during which the request for the navigation action was received), and prompts the user to confirm whether the navigation action should be performed. However, in order not to pollute the browser history, data loss prevention system 320 determines what kind of action triggered the requested navigation. Current browsers do not provide an API to distinguish between sources and directions of navigation within SPAs, thus making a clean recovery of the URL with respect to browser history difficult. Browser history API is very limited (in order to avoid security issues) and does not allow reading history items without performing navigation to each one of those items. Since there may be arbitrary URLs in the browser history (including external web pages), navigating to some history items' URLs can cause the loss of context of the web application that triggered the navigation action. Although a browser history's API can allow fetching of a history list length, once the history length exceeds 50 items, the adding or removing of items to the history list is not reflected in the returned value of that API.

Current browser history APIs are insufficient for providing a data loss prevention mechanism for SPAs, such as for the reasons discussed above. However, in some example embodiments, a history.replaceState( )API method can be employed to associate a JavaScript object, which can be serialized to JavaScript Object Notation (JSON, with the current history item (e.g., the history item currently being displayed within the web browser 310). In some example embodiments, a complimentary history API is provided to enable the tracking of a navigation history within an SPA and distinguish between navigation actions and their directions.

In some example embodiments, the event detection module 322 is configured to detect a request for a navigation action via the web browser 310 during a current state, also referred to herein as a pre-navigation state, of a single page application within the web browser 310. Examples of the navigation include, but are not limited to, navigating to a web application page from an external page by entering a URL or clicking a link or programmatically changing the URL, invoking a browser back action to a web application page from an external page, invoking a browser forward action to a web application page from an external page, invoking a browser refresh action, navigating from the same web application page with different fragment part, invoking a browser back action within the same web application page with a different fragment part, invoking a browser forward action within the same web application page with a different fragment part, closing a web application browser window or tab, and navigating to an external page from a web application page. Other navigation actions are also within the scope of the present disclosure.

In some example embodiments, the state persistence module 324 is configured to persist a state object, which can be used to track the navigation history within the SPA and distinguish between navigation actions and their directions. The state object can comprise a JavaScript object which is associated with a new history entry created by pushState( ) Whenever the user navigates to the new state, a popstate event is fired, and the state property of the event contains a copy of the history entry's state object. The state persistence module 324 can employ a history.replaceState( ) application programming interface (API) method in persisting the state object. The history.replaceState( ) API method can update the current entry on the history stack to have the specified data, title, and, if provided, URL. The history.replace State( ) API method modifies the current history entry instead of creating a new one, and is particularly useful in updating the state object or URL of the current history entry in response to some user action. One example embodiment of persisting the state object will be discussed in further detail below with respect to FIGS. 9A-9C.

Figures 4, 5:
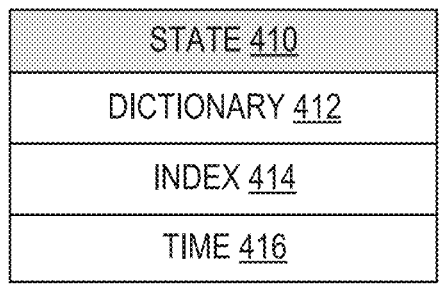
FIG. 4 illustrates a state object, in accordance with some example embodiments.
FIG. 5 illustrates a dictionary property of the state object, in accordance with some example embodiments.

FIG. 4 illustrates a state object 410, in accordance with some example embodiments. In some example embodiments, the state object 410 comprises a dictionary property 412 and an index property 414. The state object 410 can be stored and persisted in the memory of the web browser 310, or in some other data storage mechanism either internal or external to the web browser 310. In some example embodiments, the dictionary property 412 comprises a list of all URL fragments stored in a browser history of the web browser 310, with the list of URL fragments comprising a pre-navigation URL fragment corresponding to the pre-navigation state and a post-navigation URL fragment corresponding to a post-navigation state, and the post-navigation state corresponding to a result of a performance of the navigation action. FIG. 5 illustrates a dictionary property 412 of the state object 410, in accordance with some example embodiments. As seen in FIG. 5, the dictionary property 412 can comprise a list of URL fragments (e.g., URL fragment A, URL fragment B, URL fragment C, etc.) and their corresponding timestamps for the last time navigation to the corresponding URL fragment was performed. In some example embodiments, the index property 414 comprises an index of a current URL fragment in the list of the dictionary property 412. In some example embodiments, the state object 410 further comprises a time property 416, which comprises a timestamp (e.g., Time A, Time B, Time C, etc.) for when the state object 410 was last updated.

In some example embodiments, the navigation module 326 is configured to, in response to or otherwise based on the detection of the request for the navigation action, navigate the web browser 310 to the pre-navigation state of the single-page application using the state object. In some example embodiments, the navigation module 326 is configured to determine a direction of the requested navigation action based on a difference between an index of the post-navigation state and an index of the pre-navigation state, and to navigate to the pre-navigation URL fragment in an opposite direction of the determined direction of the requested navigation action.

In some example embodiments, the navigation module 326 is configured to detect unsaved data for the single-page application, and to cause a navigation confirmation request to be displayed within the recovered pre-navigation state of the single-page application using the pre-navigation URL fragment in response to or otherwise based on the detection of the unsaved data. The detection of the unsaved data can comprise detecting that a dirty bit has been set. The dirty bit can be set (e.g., turned on) in response to or otherwise based on data in the SPA being created, modified, or deleted, and the dirty bit can be reset (e.g., turned off) in response to or otherwise based on data in the SPA being saved. Other configurations are also within the scope of the present disclosure. The configuration of the dirty bit can be stored in the run-time memory of the web browser.

Figure 10:
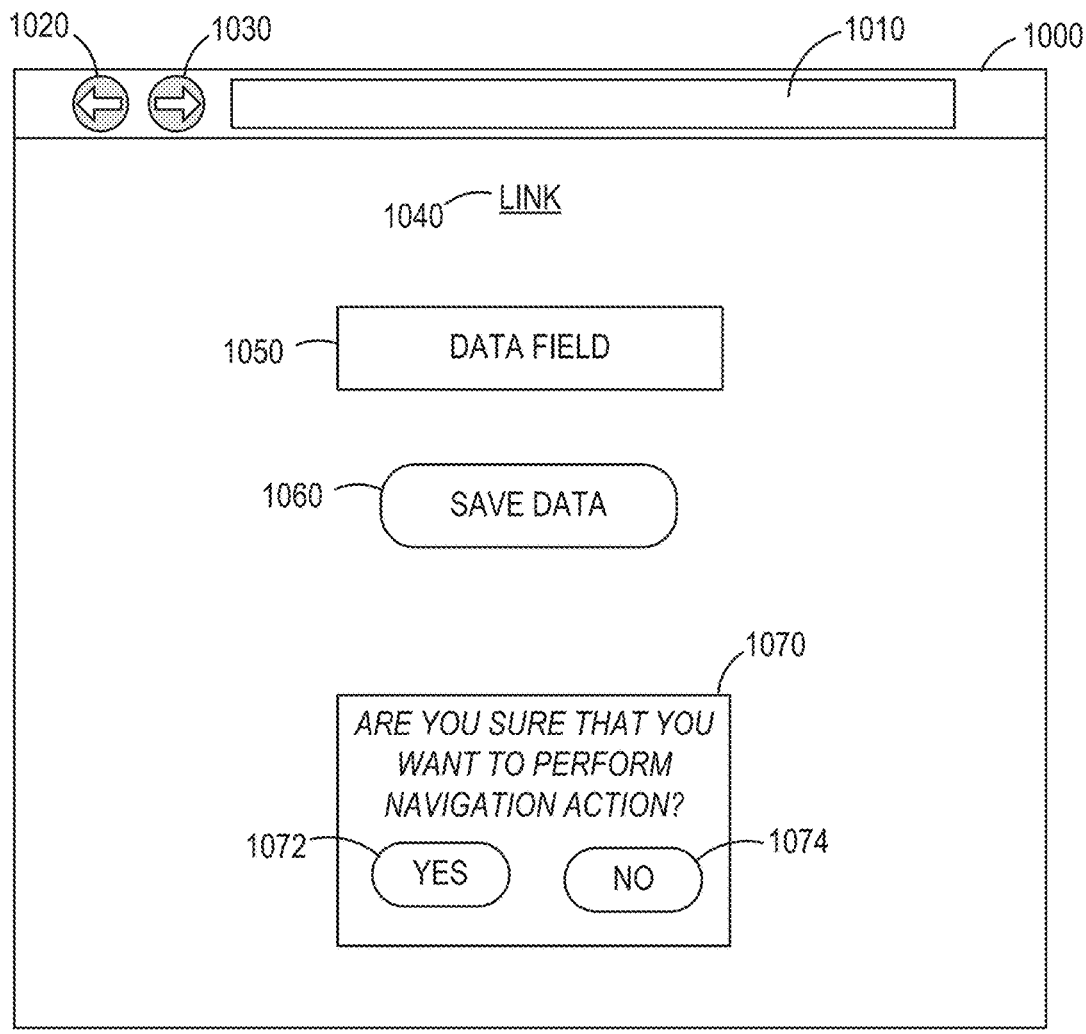
FIG. 10 illustrates a graphical user interface displaying a navigation confirmation request being displayed within the context of a single-page application within a web browser, in accordance with some example embodiments.

FIG. 10 illustrates a graphical user interface (GUI) 1000 displaying a navigation conformation request 1070 being displayed within the context of a single-page application within a web browser, in accordance with some example embodiments. The GUI 1000 displays GUI elements configured to enable a user to request a navigation action. Examples of such GUI elements include, but are not limited to, an address bar 1010 configured to show the currently displayed URL and accept a typed URL from the user, a selectable back button 1020, a selectable forward button 1030, and one or more selectable links 1040 that are a part of the single-page application. The GUI 1000 also displays one or more data fields 1050 configured to enable the user to input or otherwise configure data for the single-page application. The GUI 1000 can further display a selectable GUI element 1060 configured to cause data of the single-page application, such as data entered in the data field 1050, to be saved by the single-page application. In some example embodiments, the data can be saved in the memory of the web browser 310, although other configurations are also within the scope of the present disclosure.

As previously discussed, in response to or otherwise based on the detection of the request for the navigation action and/or the detection of unsaved data for the single-page application, a navigation confirmation request 1070 can be caused to be displayed within the recovered pre-navigation state of the single-page application. As seen in FIG. 10, the navigation confirmation request 1070 is configured to receive an indication of whether or not to perform the requested navigation action within the web browser. For example, one or more selectable GUI elements, such as a selectable GUI element 1072 for confirming navigation and a selectable GUI element 1074 for declining navigation, can be displayed within the web browser. In this respect the navigation module 326 is configured to receive an indication to perform the navigation action via the navigation confirmation request 1070, such as via the selectable GUI element 1072 for confirming navigation, and to receive an indication to not perform the navigation action via the navigation confirmation request 1070, such as via the selectable GUI element 1074 for declining navigation.

In some example embodiments, the navigation module 326 is configured to perform the requested navigation action within the browser in response to or otherwise based on receiving an indication to perform the requested navigation action (e.g., selection of the selectable GUI element 1072 for confirming navigation), and to not perform the requested navigation action within the browser in response to or otherwise based on receiving an indication to not perform the requested navigation action (e.g., selection of the selectable GUI element 1074 for declining navigation). In some example embodiments, the navigation module 326 is configured to perform the requested navigation action by navigating to the post-navigation state of the single-page application using the post-navigation URL fragment.

Figure 6:
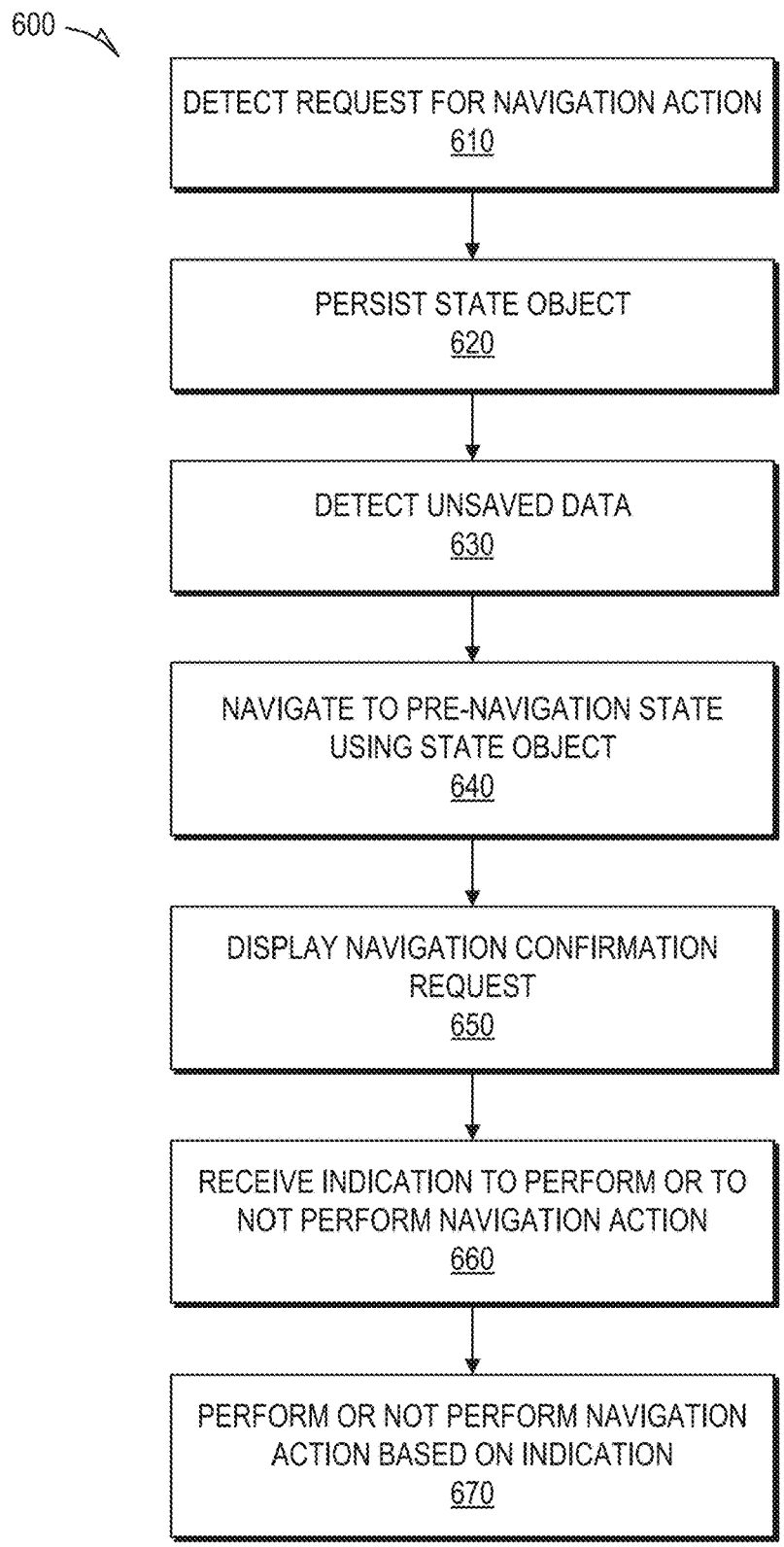
FIG. 6 is a flowchart illustrating a method of data loss prevention, in accordance with some example embodiments.

FIG. 6 is a flowchart illustrating a method 600 of data loss prevention, in accordance with some example embodiments. Method 600 can be performed by processing logic that can comprise hardware (e.g., circuitry, dedicated logic, programmable logic, microcode, etc.), software (e.g., instructions run on a processing device), or a combination thereof. In one example embodiment, the method 600 is performed by the data loss prevention system 320 of FIG. 3, or any combination of one or more of its components or modules, as described above.

At operation 610, a request for a navigation action is detected via a web browser during a pre-navigation state of a single page application within the web browser. At operation 620, a state object is persisted based on the request for the navigation action. In some example embodiments, the state object comprises a dictionary property, an index property, and a time property. In some example embodiments, the dictionary property comprises a list of all URL fragments stored in a browser history of the web browser, with the list of URL fragments comprising a pre-navigation URL fragment corresponding to the pre-navigation state and a post-navigation URL fragment corresponding to a post-navigation state, and the post-navigation state corresponding to a result of a performance of the navigation action. In some example embodiments, the index property comprises an index of a current URL fragment in the list of the dictionary property, and the time property comprises a timestamp for when the state object was last updated.

At operation 630, unsaved data for the single-page application is detected. At operation 640, based on the detection of the request, the pre-navigation state of the single-page application is navigated to within the web browser using the state object. At operation 650, a navigation confirmation request is displayed within the recovered pre-navigation state of the single-page application using the pre-navigation URL fragment based on the detecting the unsaved data, with the navigation confirmation request being configured to receive an indication of whether or not to perform the navigation action within the web browser.

At operation 660, either an indication to perform the navigation action or an indication to not perform the navigation action is received via the navigation confirmation request. At operation 670, the navigation action is either performed or not performed within the browser based on the received indication, as previously discussed. For example, in some example embodiments where the received indication comprises an indication to perform the requested navigation action, the requested navigation action is performed, while in some example embodiments, where the received indication comprises an indication to not perform the requested navigation action, the requested navigation action is not performed. In some example embodiments, performing the navigation action comprises navigating to the post-navigation state of the single-page application using the post-navigation URL fragment.

It is contemplated that any of the other features described within the present disclosure can be incorporated into method 600.

Figure 7:
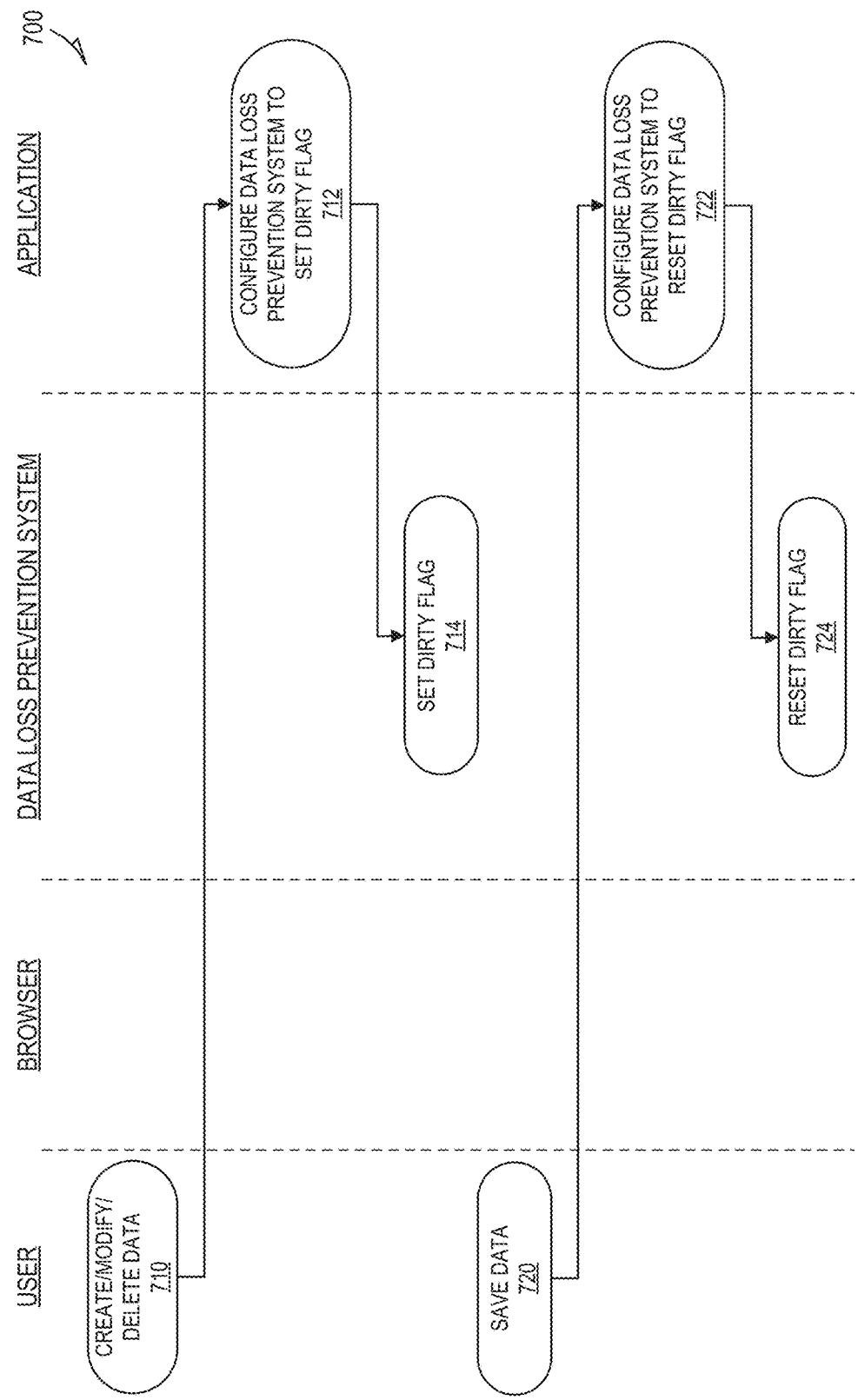
FIG. 7 is a flowchart illustrating a method of an application data lifecycle, in accordance with some example embodiments.

FIG. 7 is a flowchart illustrating method 700 of an application data lifecycle, in accordance with some example embodiments. Method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by any combination of one or more of the web browser 310, the data loss prevention system 320 (or any combination of one or more of its components or modules, as described above), and the web application 330.

At operation 710, a user requests, via the web browser 310 (e.g., via one or more GUI elements of the web application 330), to create, modify, or delete data of the web application 330. At operation 712, the web application 330 configures the data loss prevention system 320 to set the dirty flag to reflect this change in data. At operation 714, the data loss prevention system 320 sets the dirty flag accordingly based on the configuration by the web application 330 at operation 712. At operation 720, the user requests, via the web browser 310 (e.g., via one or more GUI elements of the web application 330), to save the data of the web application 330 via the web browser 310 (e.g., via one or more GUI elements of the web application 330). At operation 722, the web application 722 configures the data loss prevention system 320 to reset the dirty flag to reflect the fact that the most recent change in data of the web application 330 has been saved. At operation 724, the data loss prevention system 320 resets the dirty flag accordingly based on the configuration by the web application at operation 722.

It is contemplated that any of the other features described within the present disclosure can be incorporated into method 700.

Figure 8:
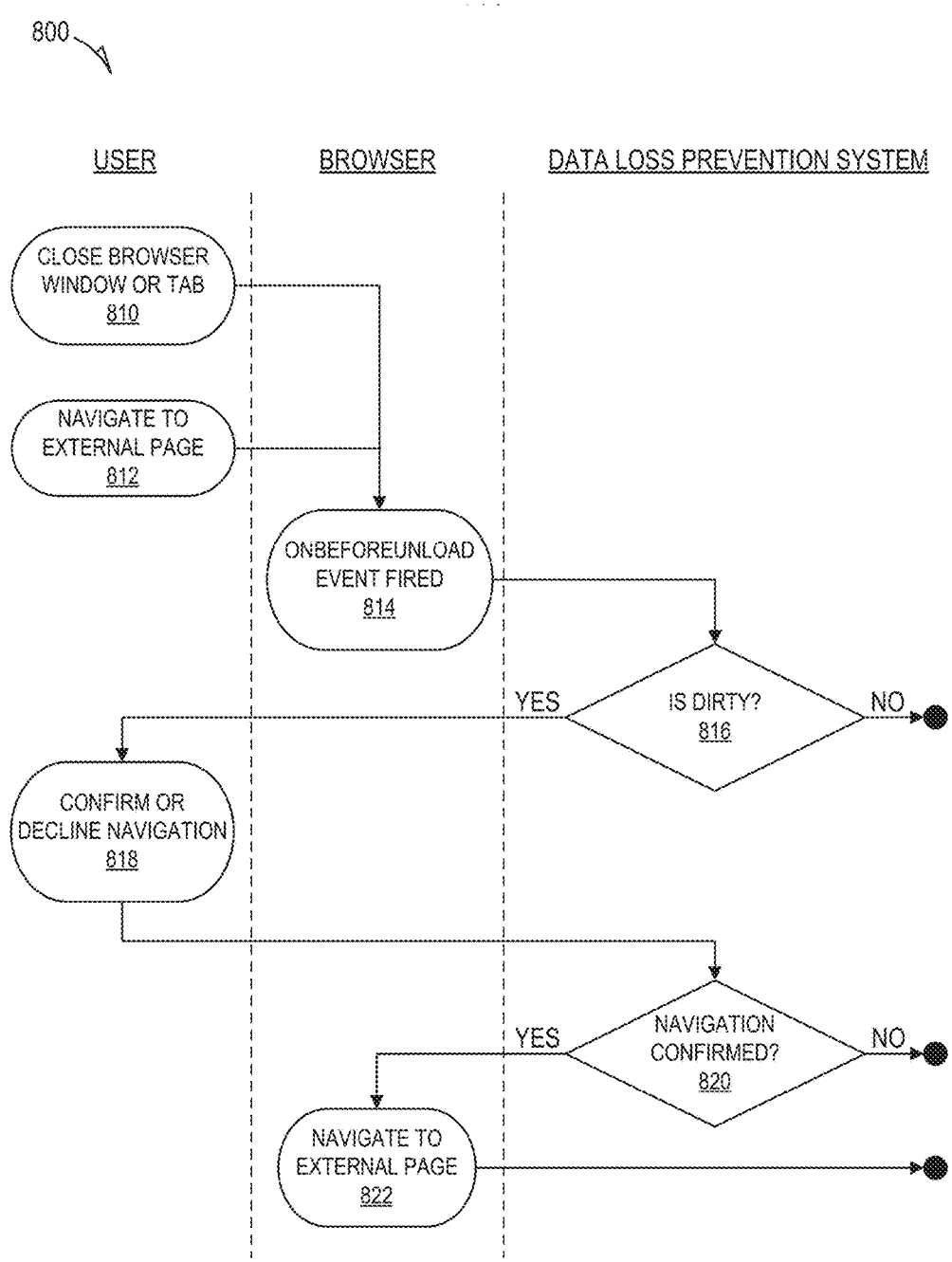
FIG. 8 is a flowchart illustrating a method of data loss prevention in the context of classical navigation, in accordance with some example embodiments.

FIG. 8 is a flowchart illustrating a method of data loss prevention in the context of classical navigation, in accordance with some example embodiments. Method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by any combination of one or more of the web browser 310, the data loss prevention system 320 (or any combination of one or more of its components or modules, as described above), and the web application 330.

At operation 810, the user requests, via the web browser 310 (e.g., via one or more GUI elements of the web browser 330), to close a window or tab of the web browser 310. Alternatively, at operation 812, the user requests, via the web browser 310 (e.g., via one or more GUI elements of the web browser 310), to navigate to an external page (e.g., to a page external to the current page displayed within the web browser 310 at the time the request is made). In response to either operation 810 or operation 812, an onbefore unload event is fired by the web browser 310 at operation 814. At operation 816, the data loss prevention system 320 determines whether or not the dirty bit has been set. If it is determined that the dirty bit has not been set, then the method 800 comes to an end. If it is determined that the dirty bit has been set, then, at operation 818, a navigation confirmation request is displayed to the user within the web browser 310, and the user either confirms of declines the navigation action that was requested (e.g., the navigation request at either operation 810 or operation 812). At operation 820, the data loss prevention system 320 determines whether or not the user has confirmed the requested navigation action. If it is determined that the user has not confirmed the navigation action (or has declined the navigation action), then the method 800 comes to an end. If it is determined that the user has confirmed the navigation action, then the web browser 310 performs the requested navigation at operation 822 and navigates to the external page. The method 800 then comes to an end.

It is contemplated that any of the other features described within the present disclosure can be incorporated into method 800.

Figure 9A:
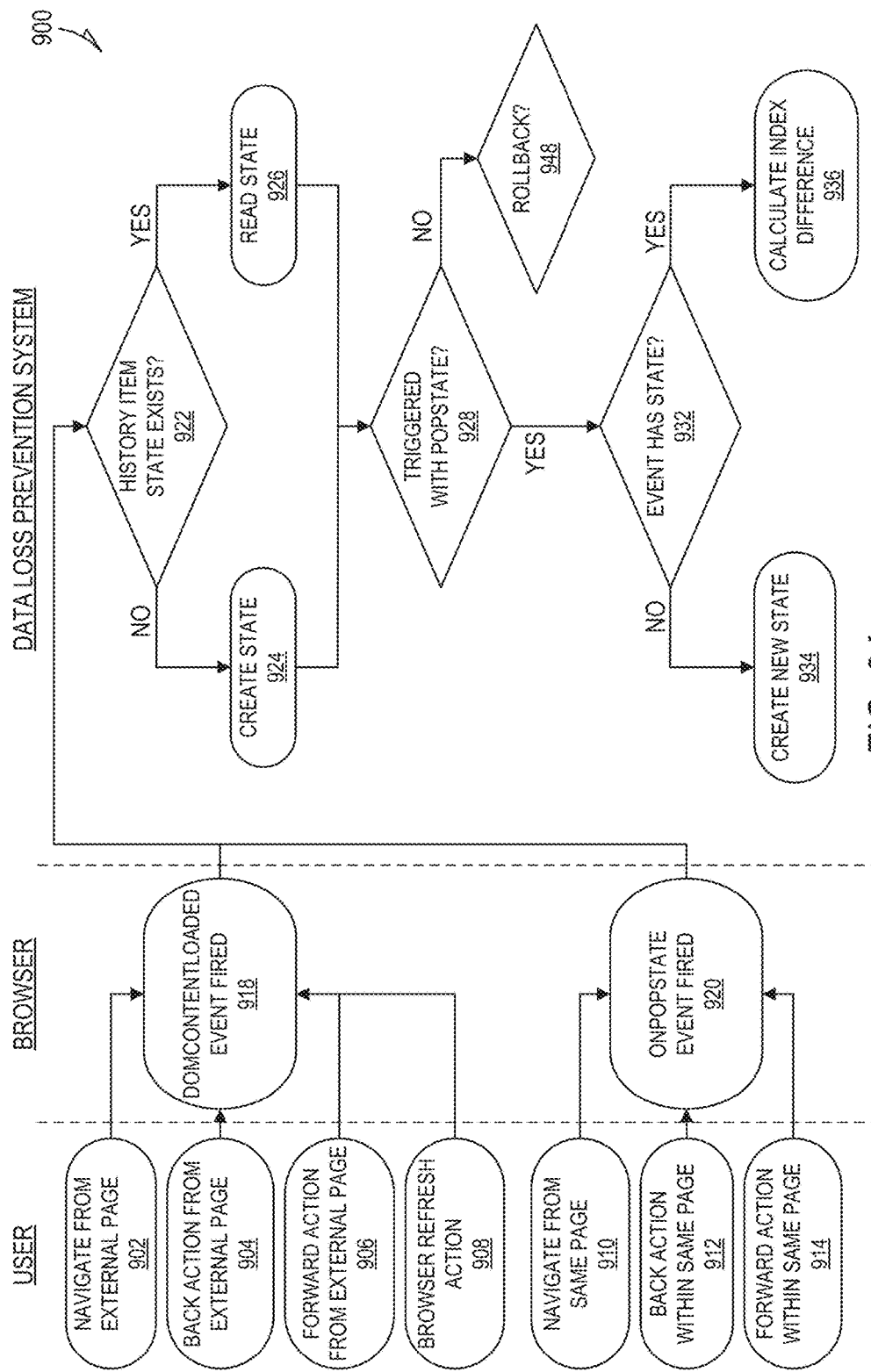
FIGS. 9A-9C is a flowchart illustrating a method of data loss prevention in the context of a single-page application (SPA), in accordance with some example embodiments.
Figure 9B:
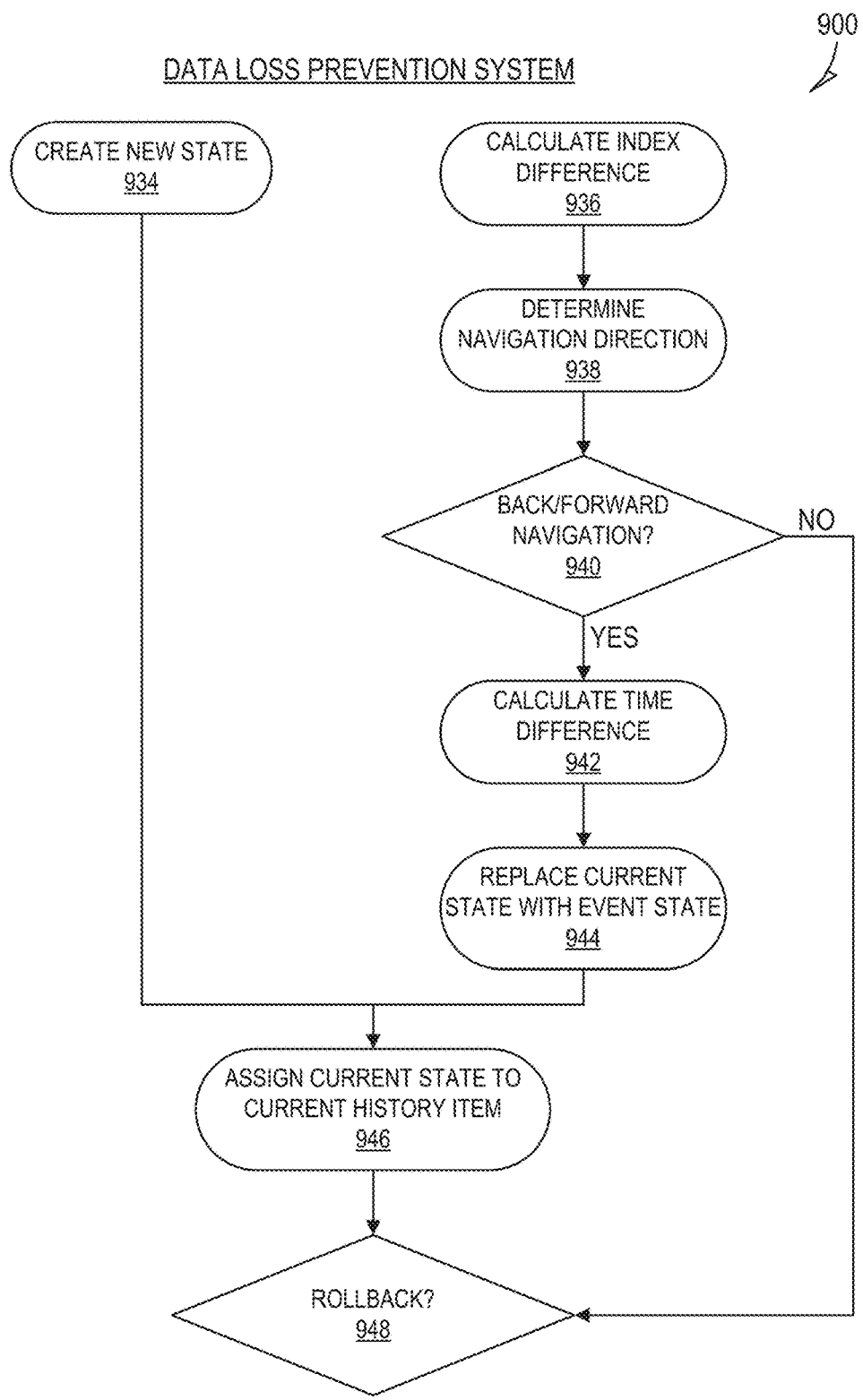
Figure 9C:
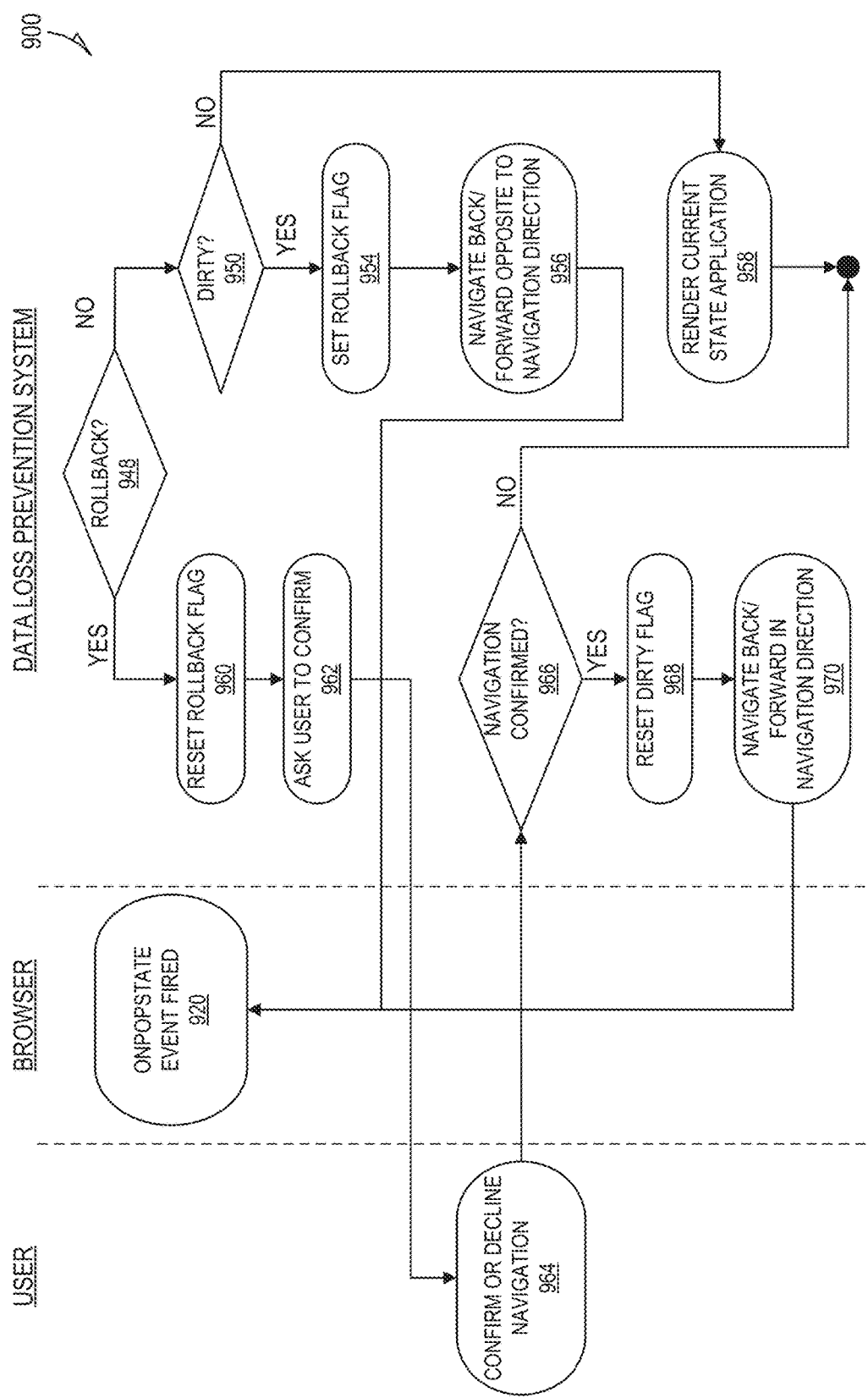

FIGS. 9A-9C are flowcharts illustrating a method 900 of data loss prevention in the context of a single-page application, in accordance with some example embodiments. Method 900 can be performed by processing logic that can comprise hardware (e.g., circuitry, dedicated logic, programmable logic, microcode, etc.), software (e.g., instructions run on a processing device), or a combination thereof. In one example embodiment, the method 900 is performed by any combination of one or more of the web browser 310, the data loss prevention system 320 (or any combination of one or more of its components or modules, as described above), and the web application 330, which is a single-page application in the embodiment of FIGS. 9A-9C.

Referring to FIG. 9A, at operations 902, 904, 906, 908, 910, 912, and 914, the user or the web application 330 (or some other program) can request, via the web browser 310 (e.g., via one or more GUI elements of the web browser 310 or via one or more GUI elements of the web application 330), to perform a navigation action. In some example embodiments, the term "user" can refer to a human user user entering a URL into the address bar of the web browser, by the user clicking a link, or by a programmatic changing of the URL At operation 902, the requested navigation action is to navigate from an external page to the single-page web application 330, such as by the user entering a URL into the address bar of the web browser, by the user clicking a link, or by a programmatic changing of the URL. At operation 904, the requested navigation action is to invoke a browser back action (e.g., via a back button) from an external page to the single-page web application 330. At operation 906, the requested navigation action is to invoke a browser forward action (e.g., via a forward button) from an external page to the single-page web application 330. At operation 908, the requested navigation action is invoke a browser refresh action. At operation 910, the requested navigation action is to navigate from within the single-page web application 330 (e.g., with a different fragment or hash identifier). At operation 912, the requested navigation action is to invoke a browser back action from within the single-page web application 330. At operation 914, the requested navigation action is to invoke a browser forward action from within the single-page web application 330.

In response to, or otherwise based on, any of the requests of operations 902, 904, 906, and 908, the web browser 310 can fire a DOMContentLoaded event at operation 918. In response to, or otherwise based on, any of the requests of operations 910, 912, and 914, the web browser 310 can fire an onpopstate event at operation 920.

In response to, or otherwise based on, either operation 918 or operation 920, the data loss prevention system 320 can determine, at operation 922, whether or not a state object 410 exists for the current history item in the browser history. If it is determined that a state object 410 does not exist, then a state object 410 is created and assigned to the current history item by the data loss prevention system 320 at operation 924. If it is determined that a state object 410 does exist, then the data loss prevention system 320 reads the state object 410 from the current history item at operation 926.

At operation 928, the data loss prevention system 320 determines whether or not a popstate browser event was fired by the web browser 310. If it is determined that a popstate browser event was not fired, then the data loss prevention system 320 determines, at operation 948, whether or not a rollback flag or bit has been set. The flow from operation 948 will be discussed in further detail below in the description of FIG. 9C. If it is determined, at operation 928, that a popstate browser event was fired, then the data loss prevention system 320 determines, at operation 932, whether or not the event has a corresponding state object 410.

If it is determined, at operation 932, that the event does not have a corresponding state object 410, then the data loss prevention system 320 creates a new state object 410 for the event at operation 934, with the index 414 of the new state object 410 being set to equal the index 414 of the current state object 410 (e.g., the state object 410 that was either created at operation 924 or read at operation 926) plus one (e.g., the index 414 of the new state object 410 is increased by one over the index 414 of the current state object), and the difference between the index 414 of the current state object 410 and the index 414 of the new state object 410 being negative one (−1). The new state object 410 can also use the current time as its time property 416, and the dictionary property 412 of the new state object 410 can be set to equal the compound of the dictionary property 412 of the current state object 410 (from the beginning of the dictionary property 412 up to the current state object index 414) and the new navigation target.

If it is determined, at operation 932, that the event does have a corresponding state object 410, then the data loss prevention system 320 calculates the difference between the index 414 of the event state object 410 and the index 414 of the current state object 410 at operation 936. Referring to FIG. 9B, at operation 938, the data loss prevention system 320 then determines the navigation direction of the requested navigation action based on the calculated index difference of operation 936. For example, the data loss prevention system 320 can determine that the requested navigation action is in one direction (e.g., forward) based on the index difference being a negative value, and can determine that the requested navigation action is in another direction (e.g., backward) based on the index difference being a positive value.

At operation 940, the data loss prevention system 320 can determine whether or not the requested navigation action comprises a back or forward navigation action (e.g., activation of browser back button, activation of browser forward button). If it is determined that the requested navigation action is not one of a browser back action or a browser forward action, then the method can proceed to operation 948, which will be discussed in further detail below in the description of FIG. 9C. If it is determined that the requested navigation action is one of a browser back action or a browser forward action, then the data loss prevention system 320 can calculate the difference between the time property 416 of the current state object 410 and the time property 416 of the event state object 410 at operation 942. This calculated time difference can subsequently be used to in conjunction with the dictionary property 412 to determine what URL fragment in the dictionary property 412 is to be used for the rollback navigation at operation 956. In some example embodiments, the corresponding time properties 416 of the state objects 410 (e.g., the current state object 410 and the event state object 410) are used to determine which of the corresponding dictionary properties 412 of the state objects 410 is the most recent or latest based on a determination of which of the time properties 416 is the most recent or latest. At operation 944, the data loss prevention system 320 can replace the current state object 410 with the event state object 410 and the latest time property 416 and dictionary property 412. At operation 946, the data loss prevention system 320 assigns the current state object 410 to the current history item of the browser history.

Referring to FIG. 9C, as previously discussed, it is determined, at operation 948, whether or not a rollback flag or bit has been set. If it is determined that the rollback flag or bit has not been set, then the method proceeds to operation 950, where the data loss prevention system 320 determines whether or not a dirty flag or bit has been set. If it is determined that the dirty flag or bit has not been set, then the data loss prevention system 320 causes the single-page web application 330 to be rendered using the current state object 410 at operation 958. If it is determined that the dirty flag or bit has been set, then the data loss prevention system 320 sets the rollback flag or bit at operation 954. At operation 956, the data loss prevention system 320 then performs a rollback operation, recovering the URL fragment of the pre-navigation state, causing a navigation of the web browser 310 in the opposite direction of the direction of the requested navigation to the calculated distance (e.g., the calculated difference), and an onpopstate event is fired again at operation 920, where the method 900 can repeat the previously discussed flow from operation 920 (e.g., from FIG. 9A).

If it is determine, at operation 948, that the rollback flag or bit has been set (e.g., the rollback operation has been performed), then the data loss prevention system 320 can reset the rollback flag or bit at operation 960. At operation 962, the data loss prevention system 320 can then prompt the user to confirm or decline the requested navigation action, and the user can provide an indication of confirming or declining the navigation action at operation 964, such as previously discussed with respect to operations 650 and 660 of FIG. 6 and the GUI 1000 of FIG. 10. At operation 966, the data loss prevention system 320 determines whether or not an indication has been provided to confirm or decline the requested navigation action. If it is determined that the user has not confirmed the requested navigation action (or declined the requested navigation action), then the method 900 can come to an end. If it is determined that the user has confirmed the requested navigation action, then, at operation 968, the data loss prevention system 320 can reset the dirty flag or bit. At operation 970, the data loss prevention system 320 can then cause the navigation of the web browser 310 to the calculated distance (e.g., the calculated difference) in the navigation direction determined at operation 938. An onpopstate event is then fired again at operation 920, where the method 900 can repeat the previously discussed flow from operation 920 (e.g., from FIG. 9A).

It is contemplated that any of the other features described within the present disclosure can be incorporated into method 900.

In some example embodiments, the following code is employed to implement one or more of the data loss prevention features discussed herein:

```
<script type="text/javascript">
    // Data Loss Prevention System
    (function ( ) {
        var originalSetDirty,
            originalHandleNavigation,
            system;
        // No need to define constructor, only static members
        system = {
            isDirty: false,
            isRollback: false,
            handleNavigation: function ( ) {
                var isConfirmed,
                    distance,
                    timeDifference,
                    latestState,
                    event;
                // Fetch last browser event that triggered navigation
                event = this.event;
                if(event.type === 'DOMContentLoaded') {
                    // History item state exists?
                    if (history.state) {
                        // Read state from current history item
                        this.readState( );
                    } else {
                        // Create new state
                        this.createNewState( );
                        // Assign new state to current history item
                        this.assignHistoryState( );
                    }
                }
                // Triggered with popstate browser event?
                if (event.type === 'popstate') {
                    // Event has state?
                    if(event.state) {
                        // Calculate difference between current state index and new state index
                        distance = this.state.index - event.state.index;
                        // Back/forward navigation?
                        if(distance !== 0) {
                            // Calculate difference between current state time and event time
                            timeDifference = this.state.time - event.state.time;
                            // Replace current state with event state index and latest dictionary and time
                            latestState = {
                                index: event.state.index
                            };
```

```
                if (timeDifference < 0) {
                    latestState.dictionary = event.state.dictionary;
                    latestState.time = event.state.time;
                } else {
                    latestState.dictionary = this.state.dictionary;
                    latestState.time = this.state.time;
                }
                this.state = latestState;
                this.assignHistoryState( );
            }
        } else {
            // Set difference between current state index and new state index to −1
            distance = −1;
            // Create state
            this.createState( );
            this.assignHistoryState( );
        }
    }
    // Is it a rollback navigation?
    if (this.isRollback) {
        // Reset rollback flag
        this.isRollback = false;
        // Ask user to confirm navigation
        isConfirmed = confirm('Are you sure you want to leave the page?');
        // Navigation confirmed?
        if(isConfirmed) {
            // Reset dirty flag
            this.setDirty(false);
            // Navigate back/forward to calculated distance according to navigation direction
            history.go(distance);
        }
    } else {
        // Is dirty?
        if (this.isDirty) {
            // Set rollback flag
            this.isRollback = true;
            history.go(distance);
        } else {
            // Render current state application
            originalHandleNavigation( );
        }
    }
},
readState: function ( ) {
    this.state = history.state;
},
createNewState: function ( ) {
    this.state = {
        index: 0,
        dictionary: [location.hash],
        time: Date.now( )
    };
},
createState: function ( ) {
    this.state = {
        index: this.state.index + 1,
        dictionary: this.state.dictionary.concat(location.hash),
        time: Date.now( )
    };
},
assignHistoryState: function ( ) {
    history.replaceState(this.state, location.hash);
},
recordEvent: function (event) {
    this.event = event;
},
setDirty: function (isDirty) {
    this.isDirty = isDirty;
    originalSetDirty(isDirty);
}
};
            document.addEventListener('DOMContentLoaded', system.recordEvent.bind(system));
            window.onpopstate = system.recordEvent.bind(system);
            window.onbeforeunload = function( ) {
                return system.isDirty ? "Are you sure you want to leave?" : null;
            };
            /*
            * Decorates single page application with data loss prevention capabilities.
            */
            function DataLossPreventionSystem (app) {
                // Save references to original methods of application
                originalSetDirty = app.setDirty.bind(app);
                originalHandleNavigation = app.handleNavigation.bind(app);
                // Override setDirty method
                app.setDirty = function decoratedSetDirty (isDirty) {
                    system.setDirty(isDirty);
                };
                // Override handleNavigation method
                app.handleNavigation = function decoratedHandleNavigation ( ) {
                    system.handleNavigation( );
                }
            }
            // Export
            window.DataLossPreventionSystem = DataLossPreventionSystem;
        }( ));
    </script>
    <script type="text/javascript">
        // Application
        (function ( ) {
            function SinglePageApplication (opts) {
                this.init(opts);
            }
            SinglePageApplication.prototype = {
                init: function (opts) {
                    var app = this;
                    if(opts && Array.isArray(opts.decorators)) {
                        opts.decorators.forEach(function (decorator) {
                            decorator(app);
                        });
                    }
                    document.addEventListener('DOMContentLoaded', this.initApp.bind(this));
                    window.addEventListener('hashchange', this.handleNavigation.bind(this));
                },
                initApp: function ( ) {
                    this.body = document.querySelector('body');
                    this.body.addEventListener('click', function (event) {
                        var element = event.target;
                        if(element.nodeName.toLocaleLowerCase( ) === 'button') {
                            this.setDirty(false);
                        }
                    }.bind(this));
                    this.body.addEventListener('keyup', function (event) {
                        var element = event.target;
                        if(element.nodeName.toLocaleLowerCase( ) === 'input') {
                            this.setDirty(true);
                        }
                    }.bind(this));
                    this.handleNavigation( );
                },
                getAppId: function ( ) {
                    return location.hash.substr(1) || 'app1';
                },
                renderApp: function (id) {
                    var template = document.getElementById(id);
                    if(template) {
                        this.body.innerHTML = template.innerText;
                    }
                },
```

-continued

```
        handleNavigation: function ( ) {
            var id = this.getAppId( );
            this.renderApp(id);
        },
        setDirty: function (isDirty) {
            document.querySelector('button').disabled = !isDirty;
        }
    };
    /*
     * Create new single page application decorated
     * with data loss prevention capabilities.
     */
    new SinglePageApplication({
        decorators: [DataLossPreventionSystem]
    });
}( ));
</script>
```

In alternative embodiments, other code can be employed to implement one or more of the data loss prevention features discussed herein.

It is contemplated that any features of any embodiments disclosed herein can be combined with any other features of any other embodiments disclosed herein. Accordingly, these any such hybrid embodiments are within the scope of the present disclosure.

Figure 11:
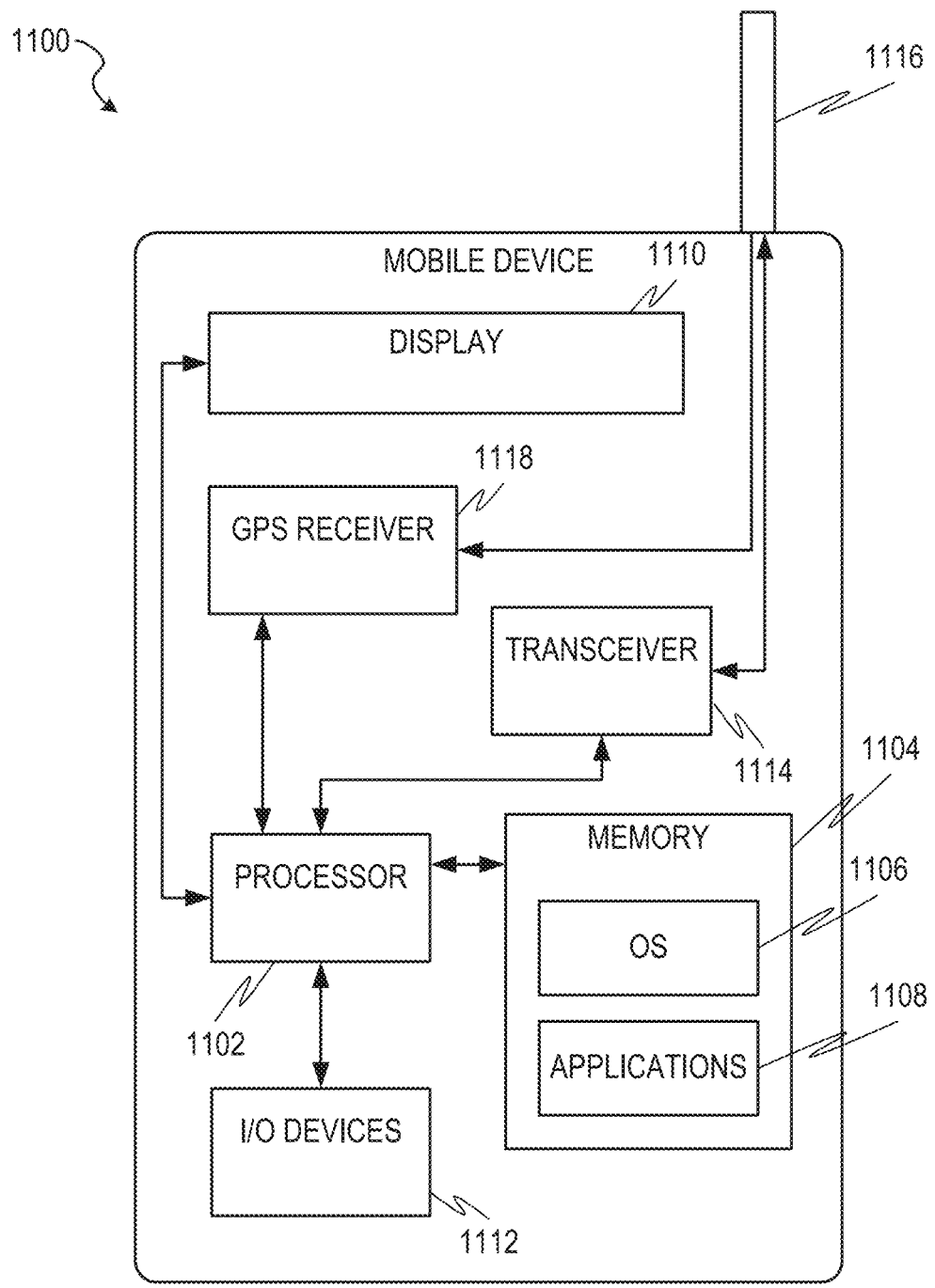
FIG. 11 is a block diagram illustrating a mobile device, in accordance with some example embodiments.

FIG. 11 is a block diagram illustrating a mobile device 1100, in accordance with some example embodiments. The mobile device 1100 can include a processor 1102. The processor 1102 can be any of a variety of different types of commercially available processors suitable for mobile devices 1100 (for example, an XScale architecture microprocessor, a Microprocessor without Interlocked Pipeline Stages (MIPS) architecture processor, or another type of processor). A memory 1104, such as a random access memory (RAM), a Flash memory, or other type of memory, is typically accessible to the processor 1102. The memory 1104 can be adapted to store an operating system (OS) 1106, as well as application programs 1108, such as a mobile location enabled application that can provide LBSs to a user. The processor 1102 can be coupled, either directly or via appropriate intermediary hardware, to a display 1110 and to one or more input/output (I/O) devices 1112, such as a keypad, a touch panel sensor, a microphone, and the like. Similarly, in some example embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 12:
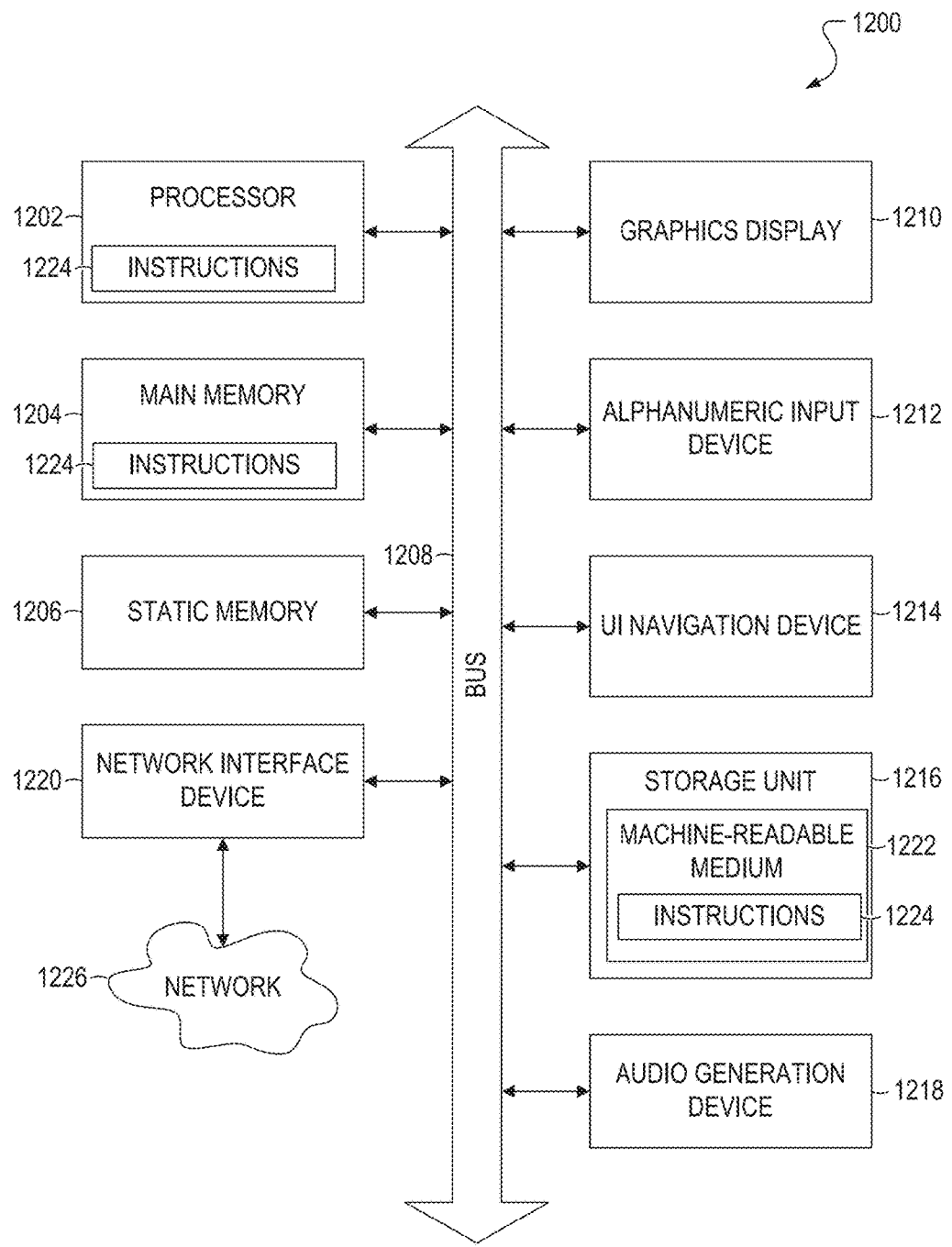
FIG. 12 is a block diagram of an example computer system on which methodologies described herein can be executed, in accordance with some example embodiments.

FIG. 12 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a graphics or video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit (e.g., a disk drive unit) 1216, an audio or signal generation device 1218 (e.g., a speaker), and a network interface device 1220.

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for selective gesture interaction using spatial volumes. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
at least one hardware processor; and
a non-transitory computer-readable medium storing executable instructions that, when executed, cause the at least one processor to perform operations comprising:
detecting a request for a navigation action via a web browser during a pre-navigation state of a single page application within the web browser, the single page application comprising a web application in which common parts between two different navigation states of the web application are not unloaded for a navigation action between the two different navigation states;
persisting a state object, the state object comprising a dictionary property and an index property, the dictionary property comprising a list of all uniform resource locator (URL) fragments stored in a browser history of the web browser, the list of URL fragments comprising a pre-navigation URL fragment corresponding to the pre-navigation state and a post-navigation URL fragment corresponding to a post-navigation state, the post-navigation state corresponding to a result of a performance of the navigation action, the index property comprising an index of a current URL fragment in the list of the dictionary property;
recovering, based on the detecting the request, the pre-navigation state of the single-page application by navigating to the pre-navigation state of the single-page application within the web browser using the state object, the navigating to the pre-navigation state of the single-page application comprising determining a direction of the navigation action based on a difference between an index of the post-navigation state and an index of the pre-navigation state, and navigating to the pre-navigation URL fragment in an opposite direction of the determined direction of the navigation action;
detecting unsaved data for the single-page application; and
displaying, based on the detecting the unsaved data, a navigation confirmation request within the recovered pre-navigation state of the single-page application using the pre-navigation URL fragment, the navigation confirmation request being configured to receive an indication of whether or not to perform the navigation action within the web browser.

2. The system of claim 1, wherein the operations further comprise:
receiving, via the navigation confirmation request, an indication to perform the navigation action; and
performing the navigation action within the browser based on the indication to perform the action, the performing the navigation action comprising navigating to the post-navigation state of the single-page application using the post-navigation URL fragment.

3. The system of claim 1, wherein the operations further comprise:
receiving, via the navigation confirmation request, an indication to not perform the navigation action; and
not performing the navigation action within the browser based on indication to not perform the navigation action.

4. The system of claim 1, wherein the operations further comprise using a history.replaceState( ) application programming interface (API) method in persisting the state object.

5. The system of claim 1, wherein the detecting the unsaved data comprises detect that a dirty bit has been set.

6. The system of claim 1, wherein the navigation action comprises one of a back navigation action and a forward navigation action.

7. The system of claim 1, wherein the state object further comprises a time property, the time property comprising a timestamp identifying when the state object was last updated.

8. A computer-implemented method comprising:
detecting a request for a navigation action via a web browser during a pre-navigation state of a single page application within the web browser, the single page application comprising a web application in which common parts between two different navigation states of the web application are not unloaded for a navigation action between the two different navigation states;
persisting, by a machine having a memory and at least one processor, a state object, the state object comprising a dictionary property and an index property, the dictionary property comprising a list of all uniform resource locator (URL) fragments stored in a browser history of the web browser, the list of URL fragments comprising a pre-navigation URL fragment corresponding to the pre-navigation state and a post-navigation URL fragment corresponding to a post-navigation state, the post-navigation state corresponding to a result of a performance of the navigation action, the index property comprising an index of a current URL fragment in the list of the dictionary property;
recovering, based on the detecting the request, the pre-navigation state of the single-page application by navigating to the pre-navigation state of the single-page application within the web browser using the state object, the navigating to the pre-navigation state of the single-page application comprising determining a direction of the navigation action based on a difference between an index of the post-navigation state and an index of the pre-navigation state, and navigating to the pre-navigation URL fragment in an opposite direction of the determined direction of the navigation action;
detecting unsaved data for the single-page application; and
displaying, based on the detecting the unsaved data, a navigation confirmation request within the recovered pre-navigation state of the single-page application using the pre-navigation URL fragment, the navigation confirmation request being configured to receive an indication of whether or not to perform the navigation action within the web browser.

9. The method of claim 8, further comprising:
receiving, via the navigation confirmation request, an indication to perform the navigation action; and
performing the navigation action within the browser based on the indication to perform the action, performing the navigation action comprising navigating to the post-navigation state of the single-page application using the post-navigation URL fragment.

10. The method of claim 8, further comprising:
receiving, via the navigation confirmation request, an indication to not perform the navigation action; and
not performing the navigation action within the browser based on the indication to not perform the navigation action.

11. The method of claim 8, wherein persisting the state object comprises using a history.replaceState( ) application programming interface (API) method.

12. The method of claim 8, wherein the detecting the unsaved data comprises detecting that a dirty bit has been set.

13. The method of claim 8, wherein the navigation action comprises one of a back navigation action and a forward navigation action.

14. The method of claim 8, wherein the state object further comprises a time property, the time property comprising a timestamp identifying when the state object was last updated.

15. A non-transitory machine-readable storage medium, tangibly embodying a set of instructions that, when executed by at least one processor, causes the at least one processor to perform operations comprising:
detecting a request for a navigation action via a web browser during a pre-navigation state of a single page application within the web browser, the single page application comprising a web application in which common parts between two different navigation states of the web application are not unloaded for a navigation action between the two different navigation states;
persisting a state object, the state object comprising a dictionary property and an index property, the dictionary property comprising a list of all uniform resource locator (URL) fragments stored in a browser history of the web browser, the list of URL fragments comprising a pre-navigation URL fragment corresponding to the pre-navigation state and a post-navigation URL fragment corresponding to a post-navigation state, the post-navigation state corresponding to a result of a performance of the navigation action, the index property comprising an index of a current URL fragment in the list of the dictionary property;
recovering, based on the detecting the request, the pre-navigation state of the single-page application by navigating to the pre-navigation state of the single-page application within the web browser using the state object, the navigating to the pre-navigation state of the single-page application comprising determining a direction of the navigation action based on a difference between an index of the post-navigation state and an index of the pre-navigation state, and navigating to the pre-navigation URL fragment in an opposite direction of the determined direction of the navigation action;
detecting unsaved data for the single-page application; and
displaying, based on the detecting the unsaved data, a navigation confirmation request within the recovered pre-navigation state of the single-page application using the pre-navigation URL fragment, the navigation confirmation request being configured to receive an indication of whether or not to perform the navigation action within the web browser.

16. The storage medium of claim 15, wherein the operation further comprise:
receiving, via the navigation confirmation request, an indication to perform the navigation action; and
performing the navigation action within the browser based on the indication to perform the action, the performing the navigation action comprising navigating to the post-navigation state of the single-page application using the post-navigation URL fragment.

17. The storage medium of claim 15, wherein the operations further comprise:
receiving, via the navigation confirmation request, an indication to not perform the navigation action; and
not performing the navigation action within the browser based on the indication to not perform the navigation action.

18. The storage medium of claim 15, wherein persisting the state object comprises using a history.replaceState( ) application programming interface (API) method.

* * * * *